United States Patent
Hobson et al.

(10) Patent No.: US 9,629,272 B1
(45) Date of Patent: Apr. 18, 2017

(54) ELECTRONIC DEVICE WITH ARRAY OF REWORKABLE COMPONENTS

(71) Applicant: Apple Inc., Cupertino, CA (US)

(72) Inventors: Phillip Michael Hobson, Menlo Park, CA (US); Nathan P. Bosscher, Campbell, CA (US); John J. Baker, Cupertino, CA (US); Craig M. Stanley, Campbell, CA (US); Brad G. Boozer, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 152 days.

(21) Appl. No.: 14/720,376

(22) Filed: May 22, 2015

Related U.S. Application Data

(60) Provisional application No. 62/057,785, filed on Sep. 30, 2014.

(51) Int. Cl.
*H05K 7/14* (2006.01)
*H01R 11/11* (2006.01)

(52) U.S. Cl.
CPC .................................... *H05K 7/14* (2013.01)

(58) Field of Classification Search
None
See application file for complete search history.

(56) References Cited

U.S. PATENT DOCUMENTS

| | | | | |
|---|---|---|---|---|
| 3,235,830 A | * | 2/1966 | Newton, Jr. | H01R 4/50 439/507 |
| 4,012,093 A | * | 3/1977 | Crane | H01R 12/777 361/750 |
| 4,477,788 A | * | 10/1984 | Collinet | H01P 7/10 331/107 SL |
| 4,712,847 A | * | 12/1987 | Hunter | H01R 13/635 439/155 |
| 4,723,117 A | * | 2/1988 | Griffiths | H01H 85/24 337/158 |
| 4,814,729 A | * | 3/1989 | Becker | H01P 5/04 330/287 |
| 4,970,477 A | * | 11/1990 | Gurcan | H01P 5/107 333/26 |
| 6,623,282 B2 | | 9/2003 | Boyd | |
| 7,750,857 B2 | * | 7/2010 | Kim | H01Q 1/242 343/702 |
| 7,887,338 B2 | * | 2/2011 | Lin | H01R 12/58 439/92 |

(Continued)

*Primary Examiner* — Xanthia C Cunningham
(74) *Attorney, Agent, or Firm* — Kilpatrick Townsend & Stockton LLP

(57) ABSTRACT

An array of electrical components may be mounted in openings in an electronic device housing. Gaskets may be used to seal the electrical components to a housing wall. The housing wall may be planar or may have a cylindrical shape or other curved shape. The electrical components may be mounted to the housing wall using screws and nuts. Each nut may have a central member with opposing stops at the ends of the central member. An opening in each central member may receive a screw to allow the nut to rotate between an installation position and a locked position. The openings in the housing wall may have scalloped extensions that allow the nuts to clear the housing wall while the components are being inserted into the housing. Following installation, the nuts may be rotated into the locked positions.

20 Claims, 16 Drawing Sheets

(56) References Cited

U.S. PATENT DOCUMENTS

| | | | | |
|---|---|---|---|---|
| 8,315,062 B2* | 11/2012 | Liu | .................. | H05K 7/142 |
| | | | | 361/759 |
| 8,654,543 B2 | 2/2014 | Lee et al. | | |
| 8,766,859 B2* | 7/2014 | Merz | .................. | H01Q 1/243 |
| | | | | 343/702 |
| 8,780,581 B2* | 7/2014 | Merz | .................. | H01Q 1/243 |
| | | | | 361/799 |
| 8,836,587 B2* | 9/2014 | Darnell | .............. | H01Q 1/243 |
| | | | | 343/700 MS |
| 8,956,166 B2 | 2/2015 | Ritner | | |
| 9,192,046 B2* | 11/2015 | Malek | ................ | H05K 1/118 |
| 2004/0069517 A1* | 4/2004 | Olson | .................. | H02G 3/06 |
| | | | | 174/481 |
| 2005/0079748 A1* | 4/2005 | Kim | .................... | H01R 4/66 |
| | | | | 439/92 |
| 2008/0146092 A1 | 6/2008 | Taylor et al. | | |
| 2008/0255556 A1* | 10/2008 | Berger | ............ | A61B 17/8605 |
| | | | | 606/60 |
| 2012/0176754 A1* | 7/2012 | Merz | .................. | H01Q 1/243 |
| | | | | 361/751 |
| 2012/0222718 A1* | 9/2012 | Sweeney | .............. | H01R 4/36 |
| | | | | 136/244 |
| 2012/0322302 A1* | 12/2012 | Mori | .................. | H01R 13/74 |
| | | | | 439/573 |
| 2013/0257659 A1* | 10/2013 | Darnell | .............. | H01Q 1/243 |
| | | | | 343/702 |
| 2015/0092324 A1 | 4/2015 | Shah et al. | | |

* cited by examiner

US 9,629,272 B1

ELECTRONIC DEVICE WITH ARRAY OF REWORKABLE COMPONENTS

This application claims the benefit of provisional patent application No. 62/057,785, filed Sep. 30, 2014, which is hereby incorporated by reference herein in its entirety.

BACKGROUND

This relates generally to electronic devices, and more particularly, to electronic devices with electronic components mounted to device housings.

Electronic devices include electronic components. Some components such as integrated circuits and batteries are mounted within interior portions of electronic device housings. Other components are mounted on the exteriors of housings. For example, components that emit or receive light or sound are often mounted in exposed locations on housings to facilitate proper operation of the components in supplying output and receiving input.

In some device designs, it may be desirable to mount multiple components in an array. For example, some electronic components benefit from operation as a coordinated group. It may be helpful in such arrangements to mount components in close proximity to each other. If care is not taken, components may be damaged during installation, damage may be created to the housing to which the components are being mounted, components may be difficult to repair when faults are detected, or components may consume more space within a device than desired.

It would be desirable to be able to address these challenges with a mounting scheme that is suitable for use when mounting components in a variety of housings.

SUMMARY

An electronic device may have a housing wall. An array of electrical components may be mounted in a corresponding array of openings in the housing wall. The components may be audio components, light-based components, sensors, or other electrical components. Gaskets may be used to seal the electrical components to the housing wall.

The housing wall may be planar or may be curved. Curved housing walls may have cylindrical shapes to form cylindrical housings. The array of openings in the housing may cover some or all of the surface of the cylindrical housing wall. Each electrical component may have a connector that is coupled to a signal path in the electrical device The electrical components may be mounted to the housing wall using screws and nuts. Each nut may have a central member with opposing stops at the ends of the central member. An opening in the central member may allow each nut to rotate between an installation position and a locked position. The openings in the housing wall may have scalloped protrusions that allow the nuts to clear the housing wall while the components are being inserted into the housing. Following installation, the nuts may be rotated into the locked positions by rotating the screws. The screws may be tightened to hold the components firmly against the housing. If it is desired to repair a component after the component has been mounted in the device, the screws and nuts may be rotated in the opposite direction to unlock the nuts and release the components.

DETAILED DESCRIPTION

Electronic devices may include components. The components may be light-based components, audio components, sensors, or other electrical components. The components may be mounted within the interior of an electronic device and/or may be mounted on the exterior of an electronic device. Configurations in which electrical components are exposed on the exterior of a housing may facilitate signal input and output operations using the components (e.g., light signals, acoustic signals, temperature information, etc.). Accordingly, configurations in which components are mounted within openings in housing surfaces are sometimes described herein as an example.

In some devices, it may be desirable to mount multiple components in proximity to each other. For example, optical components may be mounted in proximity to each other to form a display with an array of pixels or other light output device (e.g., a light-based status indicator), speakers may be mounted in an array to form a phased speaker array or to provide enhanced output levels, microphones may be mounted in an array to gather audio information from multiple directions, proximity sensors may be mounted in an array to create a touch or motion input device that can capture input from a user's hand or other external object, and other sensors and input-output components may be mounted in arrays to enhance the ability of a device to gather input and provide output.

Multiple components may be mounted adjacent to one another in a regular array having one or more rows and one or more columns of electrical components. Components may also be organized in a less regular fashion such as a pseudorandom pattern on the surface of a device housing.

Illustrative electronic devices that may be provided with components are shown in FIGS. 1, 2, 3, 4, and 5.

Figure 1:
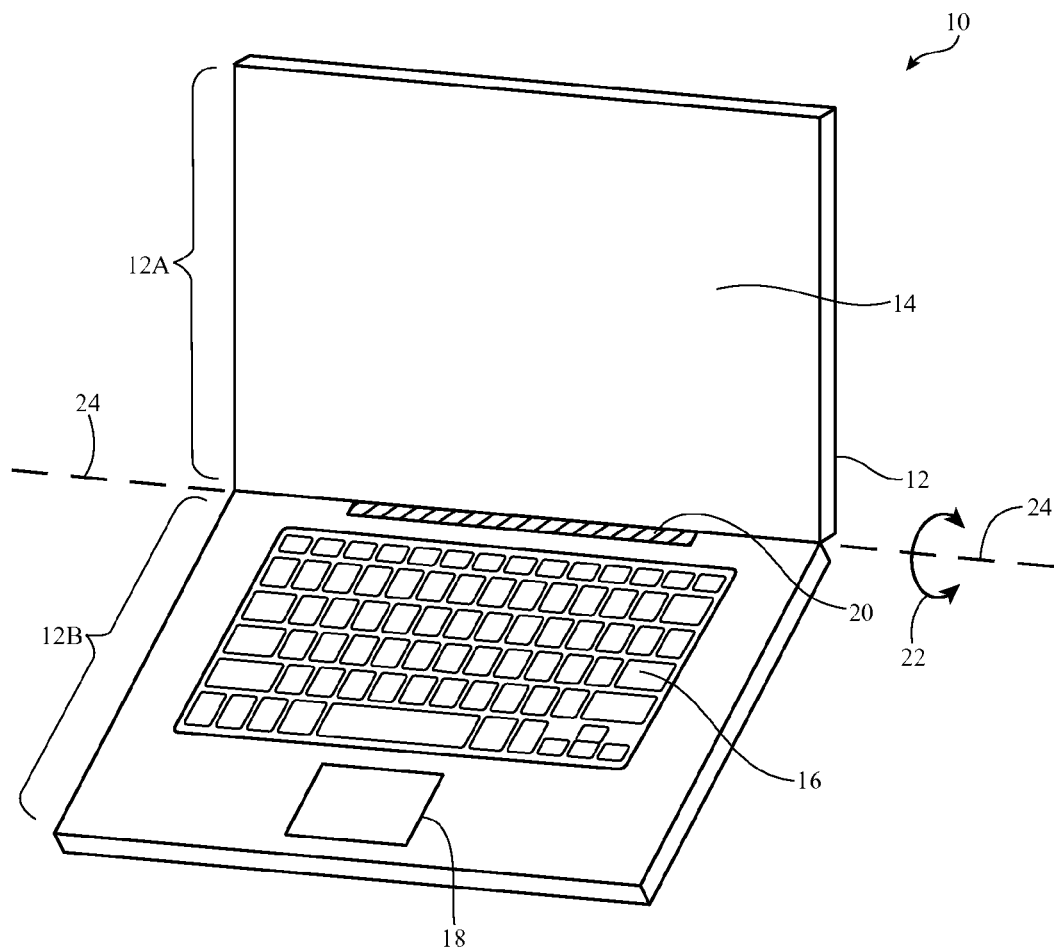
FIG. 1 is a perspective view of an illustrative electronic device such as a laptop computer in accordance with an embodiment.

Illustrative electronic device 10 of FIG. 1 has the shape of a laptop computer having upper housing 12A and lower housing 12B with components such as keyboard 16 and touchpad 18. Device 10 may have hinge structures 20 that allow upper housing 12A to rotate in directions 22 about rotational axis 24 relative to lower housing 12B. Display 14 may be mounted in upper housing 12A. Upper housing 12A, which may sometimes be referred to as a display housing or lid, may be placed in a closed position by rotating upper housing 12A towards lower housing 12B about rotational axis 24.

Figure 2:
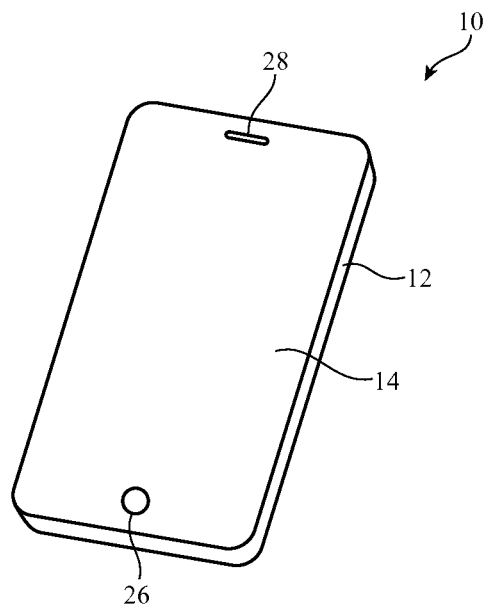
FIG. 2 is a perspective view of an illustrative electronic device such as a handheld electronic device in accordance with an embodiment.

FIG. 2 shows how electronic device 10 may be a handheld device such as a cellular telephone, music player, gaming device, navigation unit, or other compact device. In this type of configuration for device 10, housing 12 may have opposing front and rear surfaces. Display 14 may be mounted on a front face of housing 12. Display 14 may, if desired, have openings for components such as button 26. Openings may also be formed in display 14 to accommodate a speaker port (see, e.g., speaker port 28 of FIG. 2).

Figure 3:
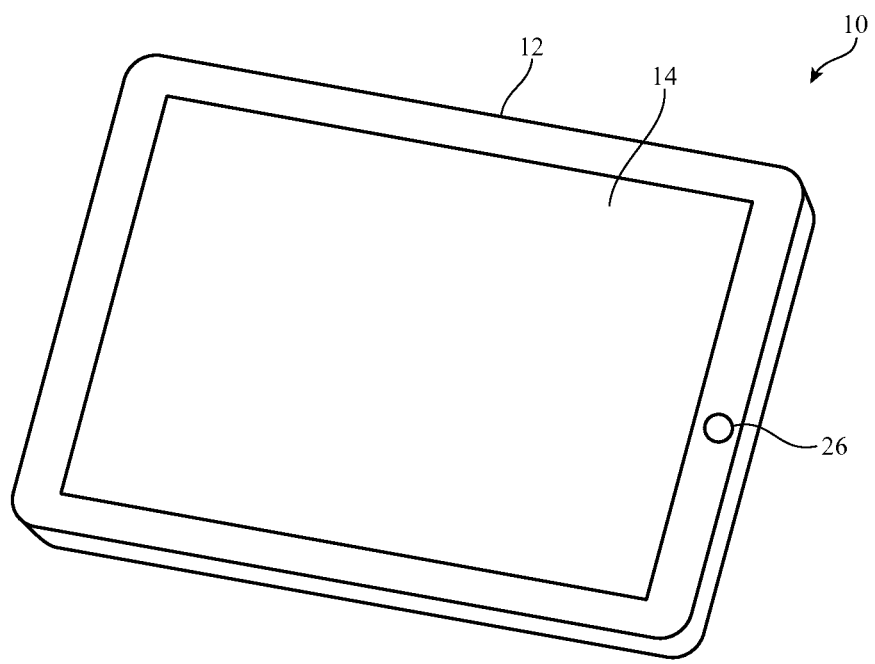
FIG. 3 is a perspective view of an illustrative electronic device such as a tablet computer in accordance with an embodiment.

FIG. 3 shows how electronic device 10 may be a tablet computer. In electronic device 10 of FIG. 3, housing 12 may have opposing planar front and rear surfaces. Display 14 may be mounted on the front surface of housing 12. As shown in FIG. 3, display 14 may have an opening to accommodate button 26 (as an example).

Figure 4:
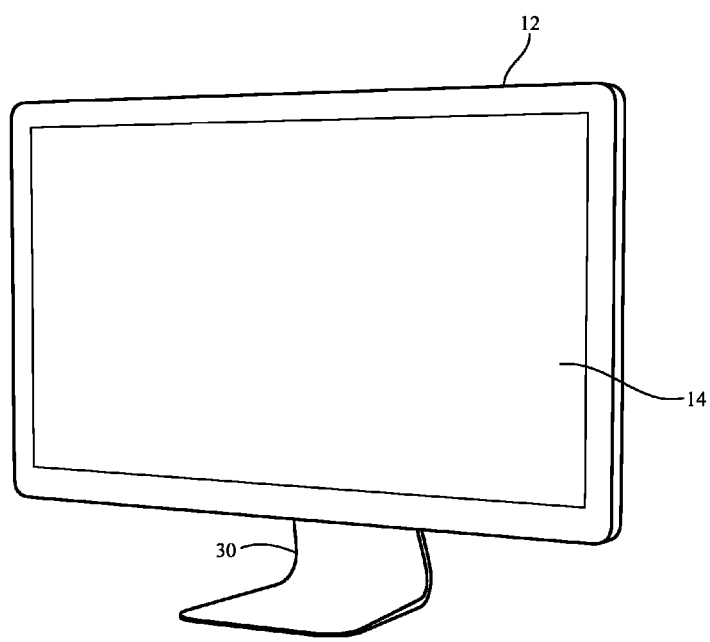
FIG. 4 is a perspective view of an illustrative electronic device such as a computer display in accordance with an embodiment.

FIG. 4 shows how electronic device 10 may be a computer display, a computer that has been integrated into a computer display, or a display for other electronic equipment. With this type of arrangement, housing 12 for device 10 may be mounted on a support structure such as stand 30 or stand 30 may be omitted (e.g., stand 30 can be omitted when mounting device 10 on a wall). Display 14 may be mounted on a front face of housing 12.

Figure 5:
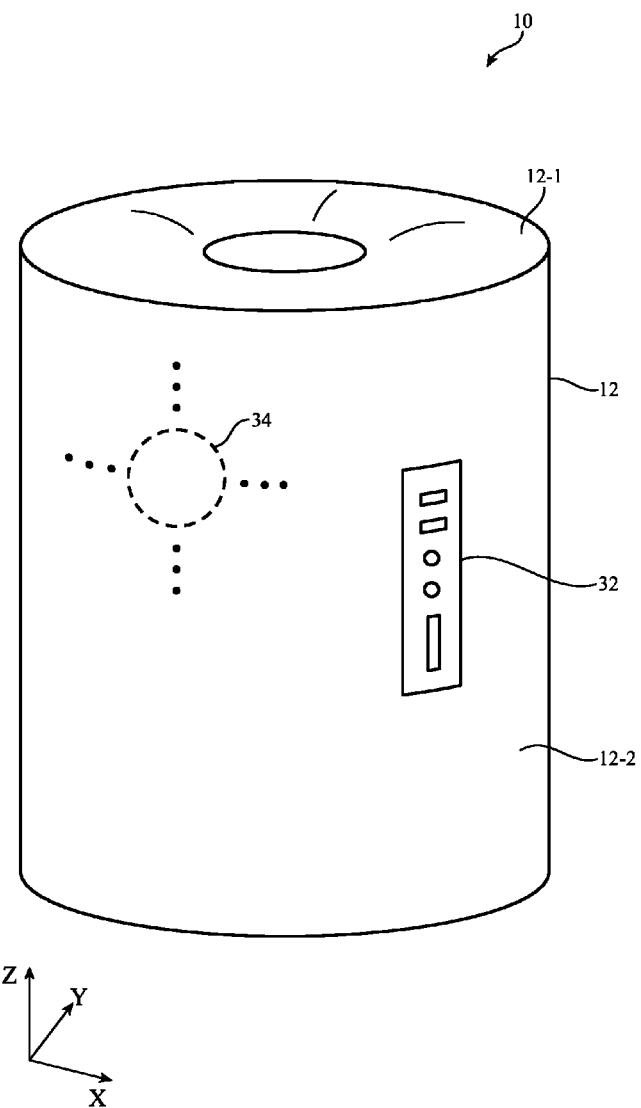
FIG. 5 is perspective of an illustrative electronic device such as a computing device or other device with a cylindrical housing that surrounds an interior region and that is surrounded by an exterior region in accordance with an embodiment.

FIG. 5 shows how electronic device 10 may have a cylindrical housing. Device 10 may be, for example, a desktop computer such as the Mac Pro computer available from Apple Inc. of Cupertino, Calif. Housing 12 may have an input-output connector region such as region 32 that contains input-output connectors (e.g., Universal Serial Bus connectors and other digital signal connectors, power connectors, audio connectors, memory card slots, and other input-output connectors). Upper surface 12-1 of housing 12 may be planar or may have curved surfaces (as shown in FIG. 5). Sidewall 12-2 of housing 12 may have a curved surface so that housing 12 has a cylindrical shape (as an example). Housing 12 may also have other shapes (e.g., conical shapes, pyramidal shapes with curved and/or planar sidewall surfaces, spherical housing shapes, other shapes, and combinations of these shapes).

Housing 12 may have a vertical dimension (height in dimension Z) that is larger than its lateral (horizontal) dimensions (i.e., widths in dimensions X and Y). Configurations in which housing 12 is shorter in height and wider in width may also be used. If desired, part of housing 12 may be cylindrical and part of housing 12 may have one or more planar sidewalls. For example, housing 12 may have the shape of a half cylinder in which the front portion of housing 12 has a cylindrical shape and the rear portion of housing 12 has a planar rear housing wall. Other shapes with cylindrical surfaces may also be used (e.g., quarter cylinders, three-quarter cylinders, etc.). Display 14 may be mounted in housing 12 or may be omitted from device 10 of FIG. 5.

The illustrative configurations for device 10 that are shown in FIGS. 1, 2, 3, 4, and 5 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, an accessory such as a charging station, a stand for a display, speaker or other electronic device, an alarm clock, a speaker, a docking station, an amplifier, a projector, a camera, a video camera, gaming equipment, a television cable box or other set-top box, lighting equipment, a motion sensor, a touch pad or other input-output device that gathers data from a touch sensor(s), networked attached storage or other data storage device, a wireless access point, a router, or other network equipment, other equipment, or equipment that implements the functionality of two or more of these devices.

Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Display 14 may include display pixels formed from liquid crystal display (LCD) components, organic light-emitting diode pixels, or other suitable image pixel structures. If desired, display 14 may be omitted from device 10 (e.g., to conserve space) or multiple displays such as display 14 may be included in device 10 (e.g., in an array). Light-based status indicators and other input-output devices may be used to supplement information displayed on display 14 or may be used to provide a user with status information and other output when display 14 has been omitted.

If desired, one or more electrical components may be mounted on housing 12. For example, a single component or an array of components may be mounted in the position(s) of illustrative component(s) 34 of FIG. 5 or elsewhere on housing 12 of FIG. 1, 2, 3, 4, or 5 or on other electronic device housings. Electrical components 34 may be mounted on a planar housing wall or a curved housing wall. Components 34 may, for example, be mounted an a surface of housing 12 where housing 12 has a non-planar surface such as where housing wall 12-2 of FIG. 5 is curved (e.g., curved on the side of a cylinder). In general, components 34 may be mounted on a curved surface such as a corner of a housing, a rounded edge of a housing, a curved sidewall, a curved front wall, a curved rear wall of housing 12, a curved top wall, etc. Configurations in which housing 12 has a cylindrical surface on which components 34 are mounted in an array (e.g., configurations of the type shown in FIG. 5 in which components 34 are mounted in an array on some or all of curved cylindrical outer surface 12-2 of housing 12) are sometimes described herein as an example.

The electrical components that are mounted to housing 12 such as components 34 of FIG. 5 may be electrical components such as light-emitting diodes, lamps, displays, lasers, or other light-emitting components, may be vibrators, buzzers, speakers, tone-generators, microphones, or other acoustic components, may be sensors such as touch sensors, temperature sensors, accelerometers, compasses, gyroscopes, position sensors, proximity sensors, or may be other suitable electronic components.

Figure 6:
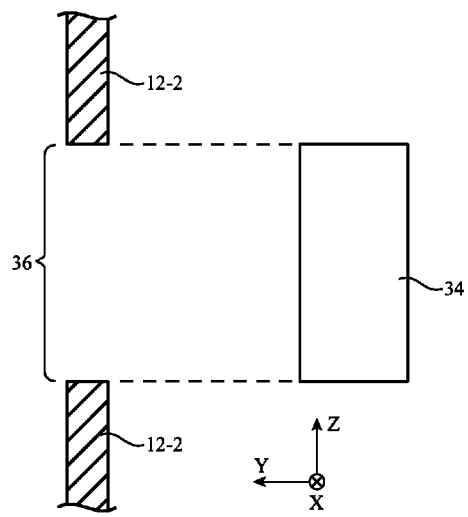
FIG. 6 is a cross-sectional side view of an illustrative electronic component being mounted in an opening in a device housing in accordance with an embodiment.

As shown in FIG. 6, each component 34 may be mounted in a respective opening in housing wall 12-2 such as opening 36. Component 34 may be mounted from the exterior of device 10 or from the interior of housing 12. After component 34 has been placed within opening 36, fasteners or other suitable attachment mechanisms (e.g., clips, adhesive, springs, other engagement features, etc.) may be used in securing component 34 to housing wall 12-2.

Figure 7:
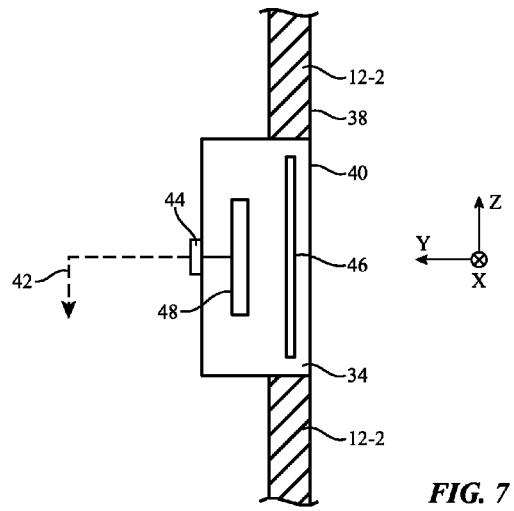
FIG. 7 is a cross-sectional side view of the illustrative electronic component of FIG. 6 following mounting of the component to the device housing in accordance with an embodiment.

As shown in FIG. 7, component 34 may be mounted so that some or all of exterior component surface 40 is flush (or nearly flush) with outer surface 38 of housing wall 12-2. In configurations in which housing wall 12-2 is curved (e.g., when wall 12-2 forms part of a cylinder), external component surface 38 may have a matching curved surface (e.g., some or all of the curvature of surface 40 of component 34 may match (or nearly match) the curvature of housing wall surface 38.

Electrical components 34 may be coupled to control circuitry using signal paths such as signal path 42 of FIG. 7. Signal path 42 may include one or more conductive lines on printed circuits or other substrates, wires, optical fibers, light-pipes, cables, plastic carriers with metal traces or other electrical signal lines, or other signal paths. The electrical and/or optical paths that are coupled to components 34 may be used to carry power signals, digital and/or analog signals (e.g., control signals, image data, audio signals, sensor information, etc.), or other signals.

Connectors such as connector 44 of FIG. 7 may be used to facilitate attachment of the electrical components to signal path 42. For example, components 34 may each have a respective connector such as connector 44 of FIG. 7 that mates with a corresponding connector on an optical and/or electrical cable or other signal path 42. Connector 44 may be a zero insertion force cable or other printed circuit connector, may be a coaxial connector or other rotationally symmetric connector for audio and/or radio-frequency signals, may be a power connector, may be a Universal Serial Bus connector or other digital data connector, may be an Ethernet connector, may be an audio connector, may be an optical connector, may be a male connector, may be a female connector, may be a locking connector, may be an reversible (orientation independent) connector with two or more operating positions, or may be any other suitable connector. If desired, connector 44 may have mating contacts that can be coupled and decoupled without using a fixed connection such as a solder or conductive adhesive connection Alternatively, connections between component 34 and a signal path may be made by using solder or conductive adhesive to join mating contacts (e.g., contacts on components 34 and mating contacts on a cable, printed circuit substrate, or other carrier with metal traces or other electrical signal lines).

Components such as component 34 of FIG. 7 may contain subcomponents such as subcomponents 46 and 48. Subcomponent 46 may be located near the front face of component 34 and may be a lens or lens system (e.g., when component 34 is an optical component), may be a diaphragm or speaker grill (e.g., when component 34 is a speaker), may be a microphone diaphragm, may be an optically or acoustically transparent window structure, may be a dielectric member (e.g., to form a window that allows electromagnetic signals for a sensor to pass through the window), may be a thermally conductive member that allows heat to pass into component 34, or may be other suitable front-of-component subcomponent. Subcomponent 48 may be a light source such as a light-emitting diode, laser, or lamp, may be a light detector such as an image sensor or photodetector, may be a speaker driver (e.g., a driver that drives a diaphragm), may be a temperature sensor such as a solid state temperature sensor or a thermocouple, may be a motion sensor, capacitive sensor, or other type of sensor, or may be other suitable electrical subcomponent for supporting the operation of component 34.

Figure 8:
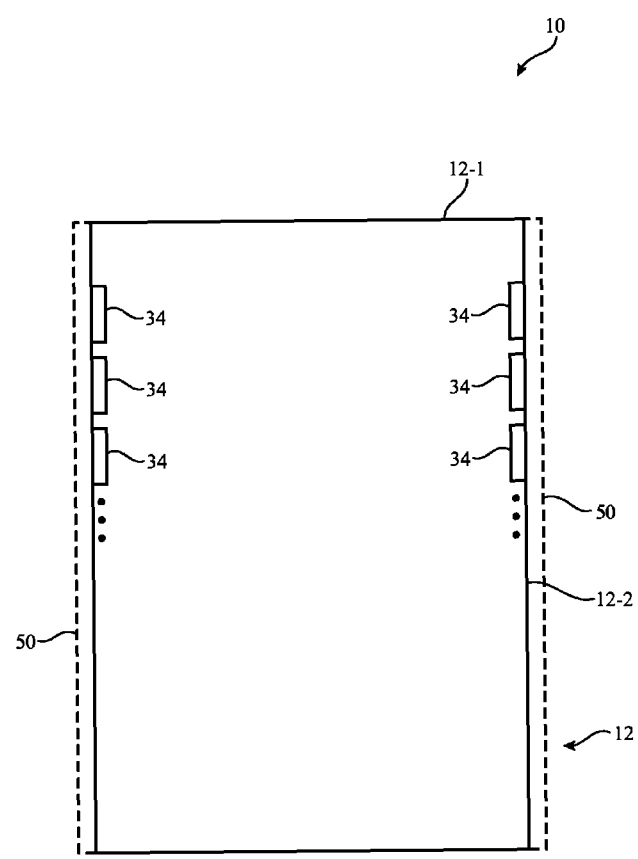
FIG. 8 is a cross-sectional side view of an electronic device showing how an array of components may be mounted to the exterior of a device housing in accordance with an embodiment.

If desired, components 34 may be mounted in a continuous (or nearly continuous) array of rows and columns on the outer curved surface of cylindrical housing wall 12-2, as shown in the illustrative cross-sectional side view of device 10 in FIG. 8. Components 34 may also be mounted on internal housing structures and/or walls such as upper wall 12-1. An optional covering such as covering 50 may be used to cover components 34. Covering 50 may be acoustically transparent (e.g., covering 50 may be a plastic mesh and/or metal mesh or other cover with openings to allow sound to pass), may be optically transparent (e.g., by using a transparent or semi-transparent material or pattern of material such as frosted glass, plastic with a thin semitransparent coating or patterned coating layer), may be sufficiently thermal conductive to allow temperature measurements to be made through covering 50 (e.g., a thin metal cover), or may be any other suitable covering structure for improving device aesthetics, enhancing component protection, etc.

There may be any suitable number of components 34 in the array of components on wall 12-2 (e.g., one or more, two or more, five or more, 10 or more, 20 or more, 50 or more 2-200, 5-150, 20-100, less than 100, less than 50, less than 300, less than 20, 20-70, 20-100, or other suitable number). The distance between adjacent components 34 may be less than 10 mm, 2-5 mm, less than 20 mm, more than 3 mm, between 1-15 mm, less than 5 mm, etc.

It may be challenging to mount components 34 to housing 12-2 in configurations in which components 34 are spaced closely together, because certain fasteners for attaching components 34 to housing 12-2 may be difficult to accommodate within limited spaces. With one suitable arrangement, which is sometimes described herein as an example, attachment mechanisms may be used that permit components 34 to be spaced closely to each other. In this type of arrangement, screws and mating nuts may form two-position lockable fasteners for attaching components 34 to housing wall 12-2. In a first of the two positions (sometimes referred to as the "installation" position), the nuts are positioned to clear the edges of opening 36 to allow component 34 to be inserted within housing wall 12-2. After installation within housing 12 in this way, the nuts may be placed in a second of the two positions (sometimes referred to as the "locked" position) in which the nuts can be tightened to hold component 34 in place.

Figure 9:
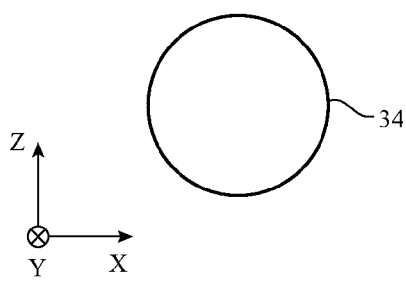
FIG. 9 is a front view of an illustrative electronic component with a circular outline in accordance with an embodiment.
Figure 10:
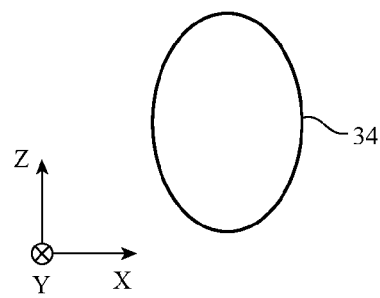
FIG. 10 is a front view of an illustrative electronic component with an oval outline in accordance with an embodiment.
Figure 11:
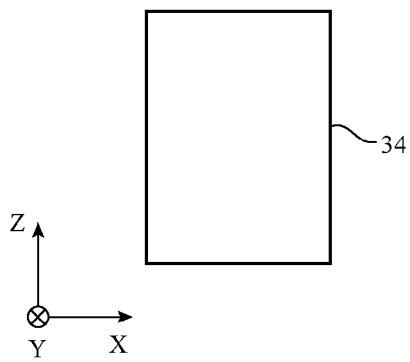
FIG. 11 is a front view of an illustrative electronic component with a rectangular outline in accordance with an embodiment.
Figure 12:
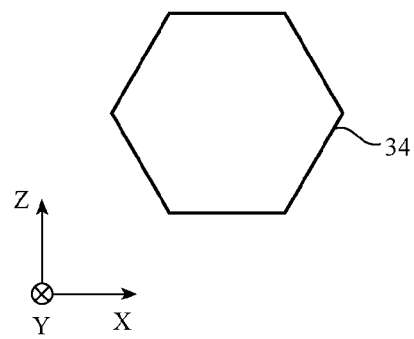
FIG. 12 is a front view of an illustrative electronic component with a hexagonal outline in accordance with an embodiment.

Components 34 may have any suitable shapes such as box shapes, frustoconical shapes (e.g., frustoconical shapes with planar and/or curved ends), pyramidal shapes, shapes with front surfaces that are wider than their opposing rear surfaces, shapes with curved edges and/or straight edges, shapes with curved front surfaces, etc.), cone shapes, step-wise varying cone shapes, spherical shapes, disk shapes, shapes with combinations of curved and straight edges and planar and/or curved sidewalls, etc.). FIGS. 9, 10, 11, and 12 are front views of illustrative shapes that may be used for components 34. In the example of FIG. 9, component 34 has a circular outline when viewed from the front (i.e., when viewed from the exterior of device 10 when component 34 has been mounted in housing sidewall 12-2). In the example of FIG. 10, component 34 has an oval outline when viewed from the front. FIG. 11 shows how component 34 may have a rectangular outline when viewed from the front. In the illustrative configuration of FIG. 12, component 34 has a hexagonal shape when viewed from the front. Other shapes may be used for component 34 if desired. The examples of FIGS. 9, 10, 11, and 12 are merely illustrative.

Figure 13:
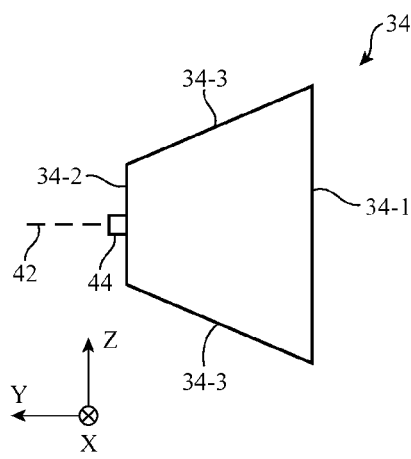
FIG. 13 is a cross-sectional side view of an illustrative electronic component with a trapezoidal cross section in accordance with an embodiment.
Figure 14:
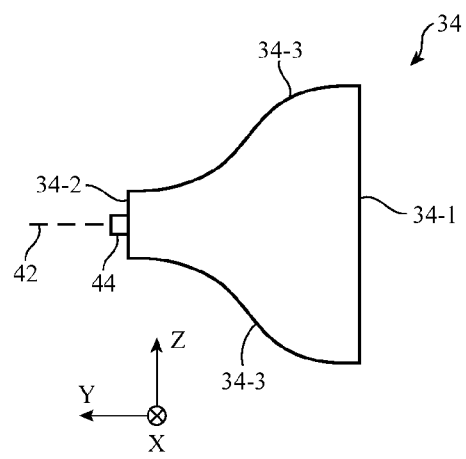
FIG. 14 is a cross-sectional side view of an illustrative electronic component with a smoothly tapered cross section in accordance with an embodiment.
Figure 15:
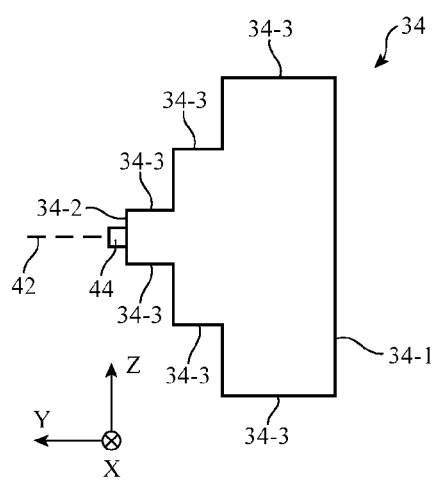
FIG. 15 is a cross-sectional side view of an illustrative electronic component with a cross section that is tapered in a step-wise fashion in accordance with an embodiment.
Figure 16:
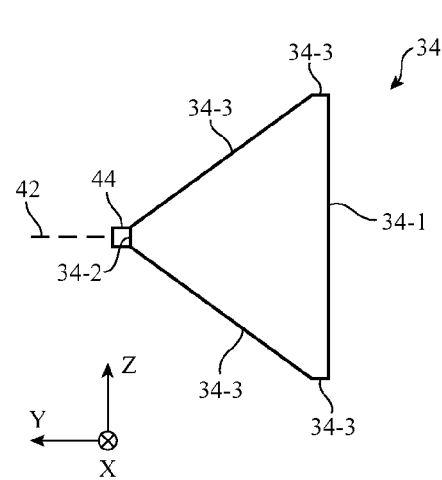
FIG. 16 is a cross-sectional side view of an illustrative electronic component with a cross section that is triangular in shape and has untapered portions in accordance with an embodiment.

Cross-sectional side views of components 34 of different illustrative shapes are shown in FIGS. 13, 14, 15, and 16. As shown in FIG. 13, component 34 may have a front face such as front face 34-1, an opposing rear face such as rear face 34-2, and side surfaces such as surfaces 34-3. Some or all of front face 34-1 may lie flush with outer surface 38 of housing 12-2 (i.e., front face 34-1 of component 34 may form exterior surface 40 of FIG. 7). In the example of FIG. 13, front face 34-1 has larger lateral dimensions (in vertical dimension Z and horizontal dimension X) than rear face 34-2. Side surfaces 34-3 form a tapering shape so that component 34 is wider at the front than at the rear. Side surfaces 34-3 are straight in the cross-sectional side view of FIG. 13. In the illustrative configuration of FIG. 14, side surfaces 34-3 have smoothly tapering curved profiles. FIG. 15 shows how side surfaces 34-3 may progressively narrow component 34 in a step-wise fashion. In the example of FIG. 16, side surfaces 34-3 have portions in which component 34 does not taper and portions in which component 34 tapers. Connector 44 may be mounted on rear surface 34-2 of component 34 or elsewhere in component 34. If desired, other side profiles may be used for component 34 (e.g., tapered and/or non-tapered profiles). The configurations of FIGS. 13, 14, 15, and 16 are shown as examples.

Figure 17:
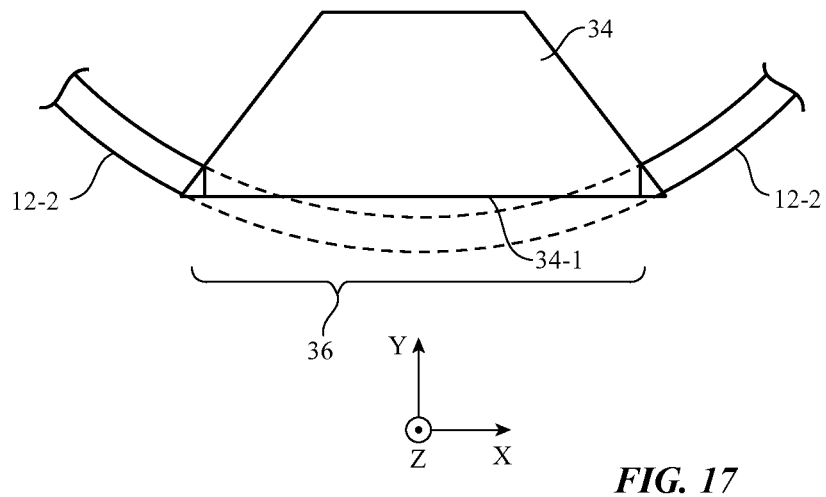
FIG. 17 is a top view of an illustrative component with a flat outer surface that has been mounted in an opening in a cylindrical housing in accordance with an embodiment.
Figure 18:
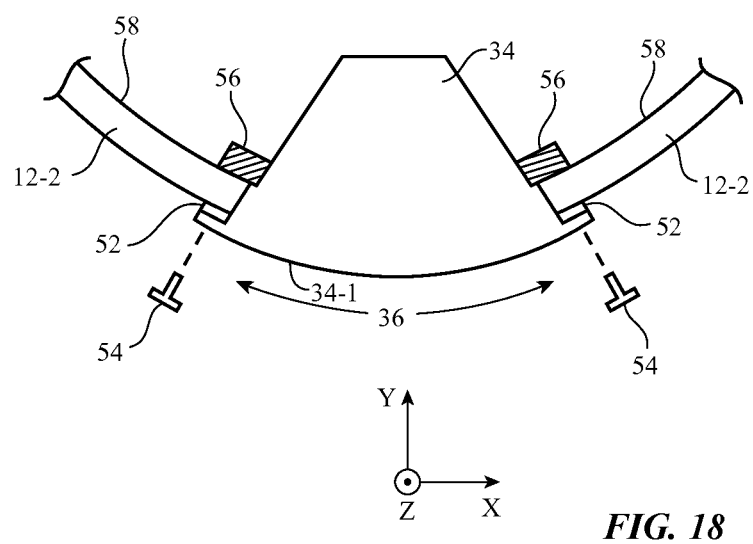
FIG. 18 is a top view of an illustrative component with a curved outer surface that has been mounted in an opening in a cylindrical housing in accordance with an embodiment.

It may be desirable to provide front face 34-1 of component 34 with a surface shape that matches the surface shape of housing wall 12-2. For example, if housing wall 12-2 has a cylindrical shape with a curved (circular) outer surface, component 34 may have a matching curved outer surface. FIG. 17 is a top view of an illustrative configuration in which component 34 has a front surface (surface 34-1) that is planar. As a result, surface 34-1 does not match the curvature of the curved outer surface of cylindrical housing wall 12-2. FIG. 18 shows how component 34 may be provided with a curved outer surface (surface 34-1) that matches the curved outer surface of cylindrical housing wall 12-2. If desired, peripheral edges of surface 34-1 or other portion of surface 34-1 may match the curved surface of cylindrical housing wall 12-2 and other portions (e.g., central portion 34-1') may have other surface shapes (e.g., protruding and/or recessed, planar, dome-shaped, etc.).

FIG. 18 shows how screws 54 may be screwed into mating nuts 56 to mount component 34 to housing 12. An elastomeric material such as elastomeric gasket 52 may be interposed between peripheral edge portions of the front of component 34 and housing wall 12-2. This may help form a seal between component 34 and housing wall 12-2. The use of a seal may help prevent the passage of dust, sound, light, air, etc. into and out of housing 12, thereby ensuring that component 34 perform satisfactorily. Nut 56 may be a rotatable threaded member that has two positions: an installation position in which nut 56 clears housing 12 and allows component 34 to be installed within device 12 and a locking (locked) position in which portions of nut 56 bear against inner surface 58 of housing wall 12-2. In the locked position, nut 56 helps pull component 34 inwardly into device 10 and helps compress elastomeric gasket 52 sufficiently to form a satisfactory seal between housing wall 12-2 and component 34.

Figure 19:
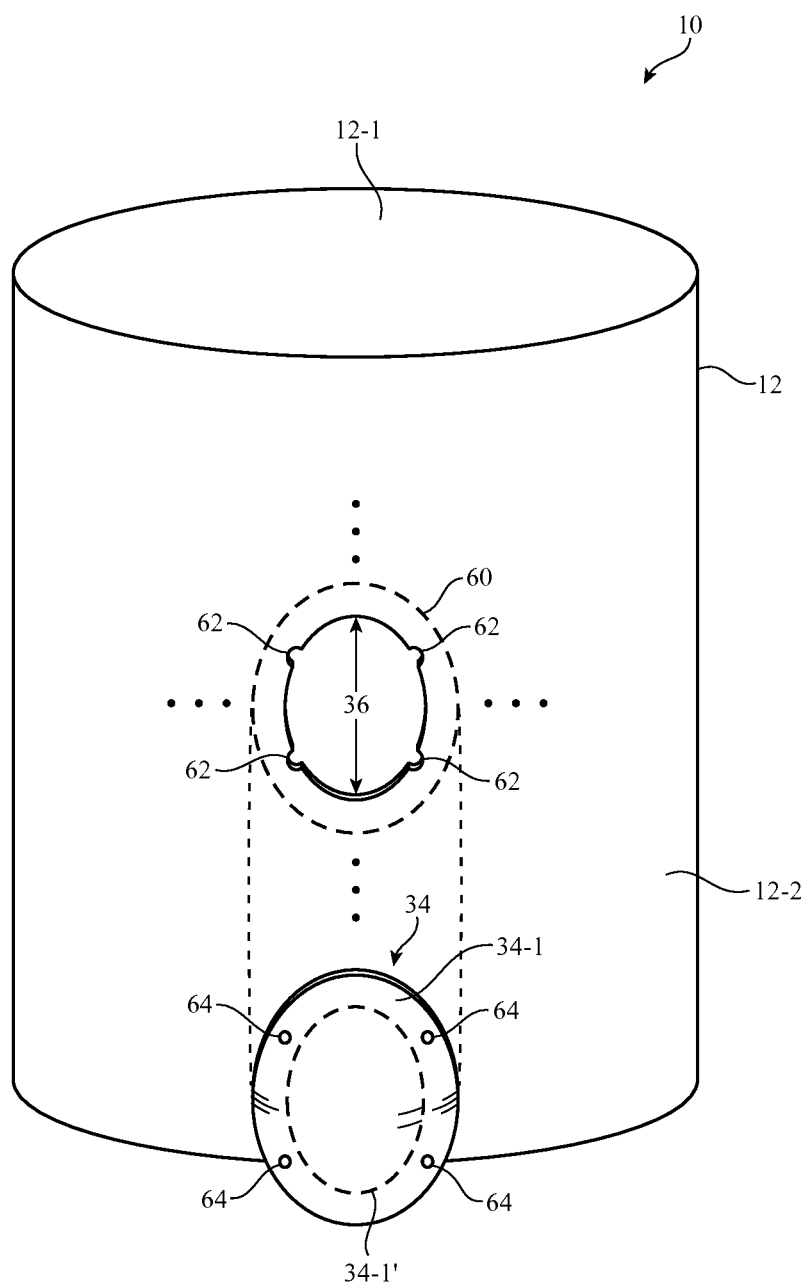
FIG. 19 is an exploded perspective view of an illustrative electronic device in which a component is being mounted in an opening in a housing with a curved surface such as a cylindrical housing in accordance with an embodiment.

FIG. 19 is an exploded perspective view of an illustrative component being mounted to an opening in an electronic device housing. As shown in FIG. 19, component 34 may have screw hole openings such as openings 64. Openings 64 may receive the shafts of screws 54 when component 34 is being mounted to housing 12. Component 34 may have a front surface such as surface 34-1 that is mounted flush with the exterior surface of housing wall 12-2. If desired, only a portion of surface 34-1 may have the same curvature as wall 12-2. For example, central portion 34-1' may have a depressed shape (e.g., an inwardly protruding dome shape or other recessed shape), may have a planar surface, may have a protruding shape (e.g., an outwardly protruding dome shape), and/or may have other shapes (e.g., shapes associated with concave and/or convex optical lenses, shapes associated with concave and/or convex speaker or microphone diaphragms, etc.). In this type of configuration, the portion of surface 34-1 that runs around the peripheral edges of portion 34-1' may lie flush with housing wall 12-2. Housing wall 12-2 may form a cylindrical shape with a curved surface. The curvature of surface 34-1 (or the peripheral portion of surface 34-1 surrounding region 34-1') may match the cylindrical curvature of housing wall 12-2 when component 34 is mounted in housing wall 12-2.

When component 34 is mounted in housing 12, the outer peripheral edge of portion 34-1 of component 34 may be aligned with mounting region 60 on housing 12-2. Gasket 52 may have a ring shape with an outer diameter that matches the shape of region 60 and an inner dimension sufficient to provide clearance for opening 36 in housing 12. Opening 36 may have outwardly protruding portions such as scalloped protrusions 62 or protrusions of other shapes to help accommodate nuts 56 during installation of component 34. In the example of FIG. 19, there are four sets of screws and nuts associated with mounting component 34 to housing 12, so there are four corresponding screw holes 64 in component 34 and four corresponding scalloped opening extensions such as protrusions 62. If desired, a different number of screws and nuts may be used in mounting each component 34 to housing 12.

Figure 20:
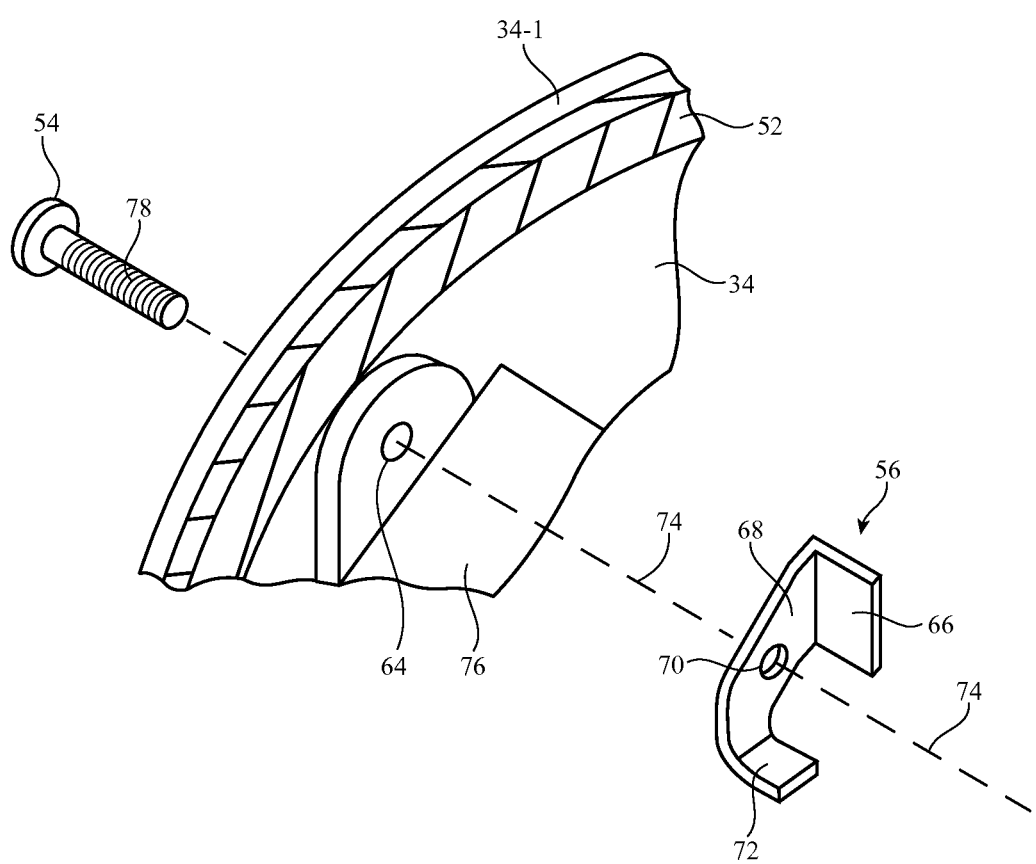
FIG. 20 is an exploded perspective view of an interior portion of an illustrative electrical component and an illustrative screw and nut for mounting the component in the housing of an electronic device in accordance with an embodiment.

FIG. 20 is an exploded interior perspective view of a portion of component 34, a portion of gasket 52, one of openings 64, one of screws 54, and one of nuts 56. As shown in FIG. 20, the shaft of screw 54 passes through opening 64 in component 34 and is received within threaded opening 70 of nut (threaded member) 56. The shaft of screws 54 may have threads 78 that engage with corresponding threads in opening 70 and thereby attach nut 56 to screw 54 so that screw 54 and nut 56 rotate in unison about rotational axis 74 until further rotation of nut 56 is impeded by contact between nut 56 and portions of component 34. If desired, locking adhesive may be applied to threads 78 and the threads of nut 56 to help secure nut 56 to the shaft of screw 54. Before the locking adhesive sets, nut 56 can rotate freely on screw 54. After the locking adhesive sets, nut 56 will be secured to screw 54 until sufficient force is applied to release the adhesive bond between nut 56 and screw 54.

Nut 56 may have a central body portion such as body portion 68 in which opening 70 is formed. At opposing ends of body 68, nut 56 may be provided with stop surfaces such as planar stop surface 66 and planar stop surface 72. Component 34 may have a corresponding stop surface such as planar electrical component stop surface 76 adjacent to opening 64. Nut 56 is configured so that stop surface 66 rests against stop surface 76 (with the plane of surface 66 parallel to the plane of surface 76) or so that stop surface 72 rests against stop surface 76 (with the plane of surface 72 parallel to the plane of surface 76). Surfaces 66 and 76 will be parallel when nut 56 is in its installation position. Surfaces 72 and 76 will be parallel when nut 56 is in its locked position. Nut 56 may be rotated by 90° or other suitable angle to transition between the position in which stop surface 66 is resting against stop surface 76 and the position in which stop surface 72 is resting against stop surface 76.

Figure 21:
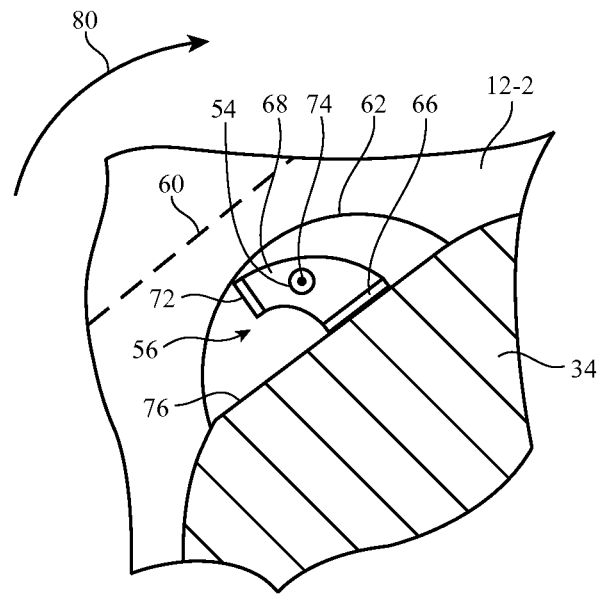
FIG. 21 is an interior view of an illustrative mounting nut in an installation position that permits installation of an electronic component to a housing from the exterior of the housing in accordance with an embodiment.

FIG. 21 is an interior view of component 34 and housing wall 12-2 in which nut 56 has been placed in its in its installation (unlocked) position. Nut 56 may be placed in this position prior to installation of component 34 in housing 12 or may be returned to this position from the locked position by rotation of screw 54 about axis 74 in direction 80. For example, nut 56 may be moved to the installation position from the locked position when it is desired to remove component 34 from device 10 for rework or repair (e.g., to replace component 34 in the event that component 34 is faulty). As nut 56 is rotated in direction 80, stop surface 66 of nut 56 comes into contact with stop surface 76 of component 34. As surface 66 bears against surface 76, additional rotation of nut 56 about axis 74 is inhibited. The size and shape of nut 56 is preferably configured to allow nut 56 to clear scalloped opening extension 62 of housing wall 12-2. This allows component 34 to be installed into opening 36. Nut 56 may be rotated by 90° or other suitable angle to move nut 56 between the installation position and the locked position.

Because the shaft of screw 54 does not directly screw into housing 12-2 in this type of arrangement, risk of damage to housing 12 and therefore damage to device 10 is avoided. This can be helpful in scenarios in which the array of components on housing 12 is relatively large in number, because of the increased risk of encountering a faulty screw thread or other defect when mounting a large number of components. When nuts 56 are used to receive screws 54, a damaged nut can be replaced without replacing housing 12.

Figure 22:
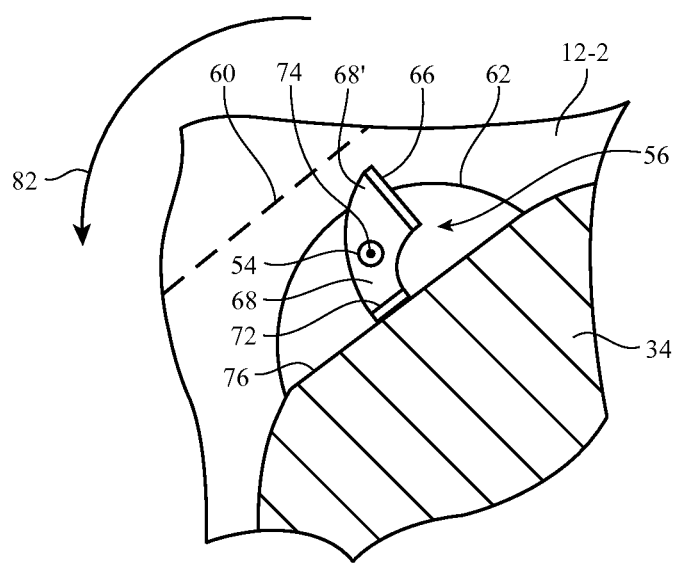
FIG. 22 is an interior view of the mounting nut of FIG. 21 in a locked position suitable for maintaining the component in a mounted position on the exterior of an electronic device in accordance with an embodiment.

FIG. 22 shows nut 56 in its locked position. Nut 56 may be placed in this position by rotating screw 54 in direction 82 about axis 74 until stop surface 72 of nut 56 bears against planar surface 76 of component 34. Screw 54 can then be rotated further in direction 82 to pull nut 56 towards screw 54 (into the page in the orientation of FIG. 22). Portion 68' of nut body 68 bears against the interior of wall 12-2 as screw 54 is tightened. This compresses gasket 52 between portion 34-1 of component 34 and housing wall 12-2 to form a seal between component 34 and housing 12.

Figure 23:
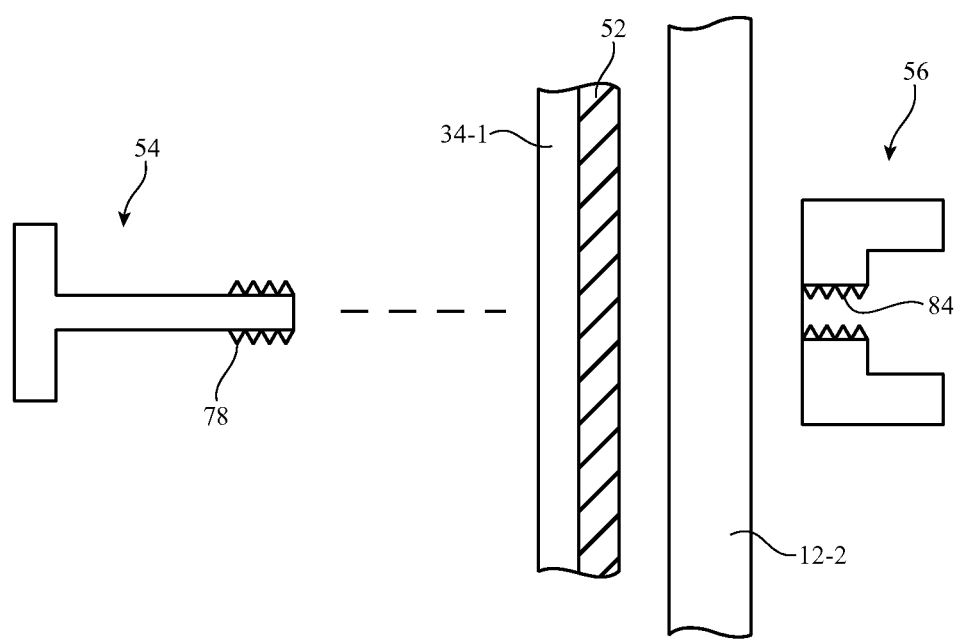
FIG. 23 is an exploded cross-sectional side view of an electrical component and housing to which the electrical component may be mounted using a screw and nut in accordance with an embodiment.
Figure 24:
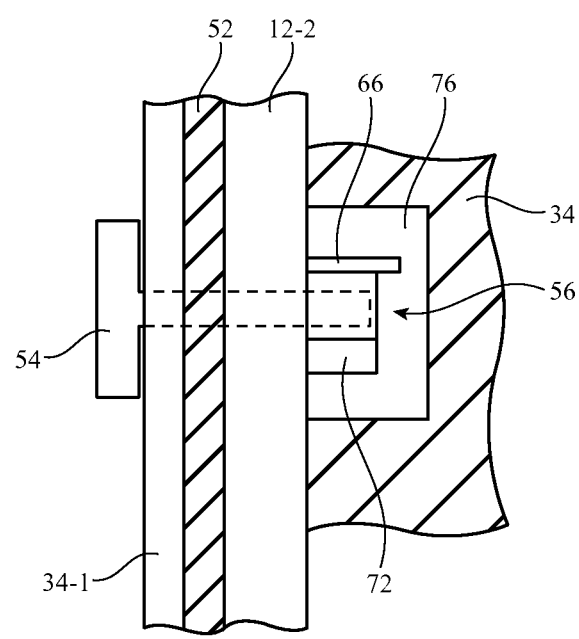
FIG. 24 is a cross-sectional side view of the component and housing of FIG. 23 following locking of the nut in accordance with an embodiment.

FIG. 23 is an exploded top view of screw 54, component portion 34-1, gasket 52, housing wall 12-2, and nut 56, showing how nut 56 may have threads 84 that mate with threads 78 on the shaft of screw 54. FIG. 24 is a top view of the structures of FIG. 23 when nut 56 is in its locked position and gasket 52 is being compressed between exterior surface portion 34-1 of component 34 and housing wall 12-2 of housing 12.

Figure 25:
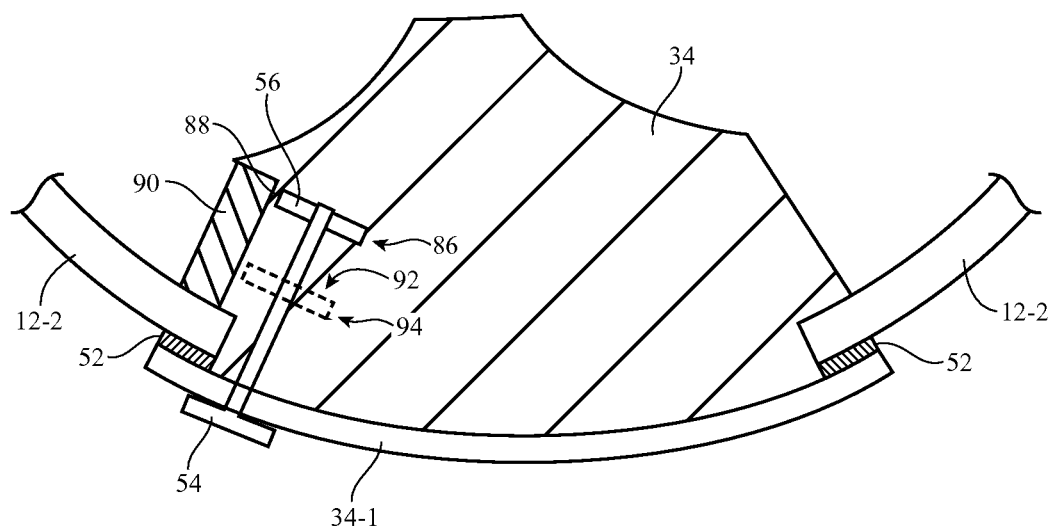
FIG. 25 is a cross-sectional top view of an illustrative component that is being mounted to an electronic device housing using a nut that is captured in a track while the nut is being tightened during mounting of the component in accordance with an embodiment.

If desired, nut 56 may be captured by a track structure that is formed from portions of component 34 and/or portions of housing 12. This type of arrangement is shown in FIG. 25. As shown in FIG. 25, nut 56 may initially be in location 86 (i.e., immediately after installation of component 34 in housing 12). In this position, edge portion 88 of nut 56 may bear against track structure 90 (e.g., part of housing 12 or component 34). As screw 54 is rotated, nut 54 is pulled in direction 92 towards position 94. Nut 54 is prevented from rotating relative to housing 12 by the presence of track structure 90. Following rotation of screw 54, nut 54 will bear against the inner surface of housing wall 12-2, thereby compressing gasket 52 between component portion 34-1 and housing wall 12-2.

The use of a screw and nut fastening system for mounting components 34 in housing 12 may facilitate mounting in configurations where space is limited (i.e., screws and nuts may provide a low-profile solution satisfactory for use where additional space for alternative fastening mechanisms might not be accommodated). In devices 10 were space is less limited, components 34 may be mounted using toggle bolts, springs and clips, mating engagement features such as grooves and protrusions, other attachment mechanisms, or combinations of these mechanisms.

Figure 26:
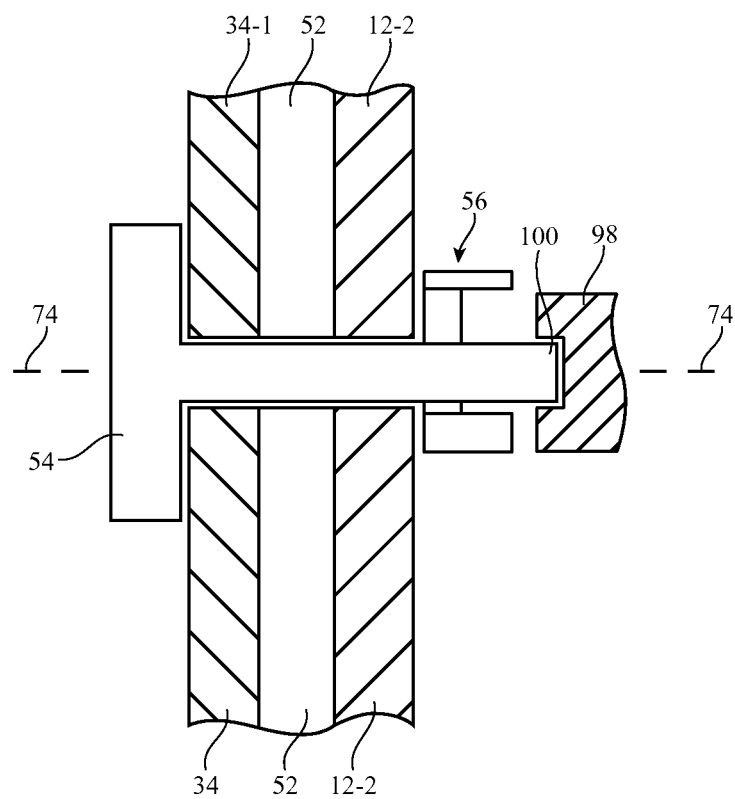
FIG. 26 is a cross-sectional top view of an illustrative component mounting arrangement having a structure such as a housing structure or component structure that helps stabilize a tip portion of a mounting screw in accordance with an embodiment.

If desired, structures such as support structure 98 of FIG. 26 may be provided that receive tip 100 of screw 54 and thereby stabilize screw 54 during rotation about axis 74. Support structure 98 may be part of housing 12, part of component 34 (e.g., one of two joined plastic portions of component 34), or other suitable support structure in device 10.

The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:
   a housing have a housing wall with an opening;
   an electrical component; and
   at least one screw and at least one corresponding nut that mount the electrical component within the opening, wherein the nut moves between an installation position that allows the electrical component to be installed within the opening and a locked position in which the electrical component is secured to the housing wall and wherein the nut has a first stop that bears against the electrical component when the nut is in the installation position and a second stop that bears against the electrical component when the nut is in the locked position.

2. The electronic device defined in claim 1 wherein the housing wall has a curved surface and wherein the electrical component has a curved exterior surface portion that matches the curved surface of the housing wall.

3. The electronic device defined in claim 2 wherein the housing comprises a cylindrical housing and wherein the housing wall forms a curved cylindrical surface for the cylindrical housing.

4. The electronic device defined in claim 3 wherein the housing comprises metal.

5. The electronic device defined in claim 1 wherein the electrical component comprises a component selected from the group consisting of: a light source, a light detector, a speaker, and a sensor.

6. The electronic device defined in claim 1 wherein the electrical component comprises a component selected from the group consisting of: a light source and a speaker.

7. The electronic device defined in claim 6 wherein the housing comprises an array of openings including the opening and wherein additional electrical components are mounted in the array of openings using respective screws and nuts that rotate between an installation position and a locked position.

8. The electronic device defined in claim 1 wherein the electronic component has an exterior surface with an opening that receives a shaft of the screw.

9. The electronic device defined in claim 8 further comprising an elastomeric gasket that is compressed between the housing wall and the electronic component when the nut is in the locked position.

10. The electronic device defined in claim 9 wherein the electronic component has a circular exterior surface and wherein the elastomeric gasket comprises a ring-shaped gasket.

11. An electronic device, comprising:
    a housing having a housing wall with an array of openings;
    a plurality of electrical components each of which is mounted in a respective one of the openings; and
    a plurality of screws and corresponding nuts that mount the electrical components within the respective openings, wherein each nut is movable between an installation position that allows the electrical component to be installed within the opening and a locked position in which the electrical component is secured to the housing wall.

12. The electronic device defined in claim 11 wherein each electrical component is installed in a respective one of the openings before rotating the nuts to the locked positions and wherein each opening has a plurality of outwardly protruding extensions, each extension being configured to allow a corresponding one of the nuts to pass through the opening during installation.

13. The electronic device defined in claim 12 wherein each nut has a first stop that bears against an electrical component stop surface when the nut is in the installation position and a second stop that bears against the electrical component stop surface when the nut is in the locked position.

14. The electronic device defined in claim 13 wherein each nut has a threaded central member with opposing ends that support the first and second stops.

15. The electronic device defined in claim 13 wherein the electrical component stop surface comprises a planar electrical component stop surface, wherein the first and second stops comprises respective first and second planar stops, wherein the first planar stop is parallel to the planar electrical component stop surface when the nut is in the installation position, and wherein the second planar stop is parallel to the planar electrical component stop surface when the nut is in the locked position.

16. The electronic device defined in claim 15 wherein each electrical component is an audio component with a circular outline.

17. The electronic device defined in claim 15 wherein each electrical component is a light-based component.

18. The electronic device defined in claim 15 wherein the array includes 20-100 of the openings, wherein there are 20-100 of the electrical components mounted in the openings, and wherein the housing wall comprises a curved housing wall.

19. An electronic device, comprising:
    a cylindrical housing surrounding an interior region and being surrounded by an exterior region, wherein the cylindrical housing has a cylindrical housing wall covered with an array of openings passing between the exterior region and the interior region;
    a plurality of electrical components each of which is mounted in a respective one of the openings; and
    screws and nuts that mount the electrical components within the respective openings, wherein each of the electrical components is mounted in a respective one of the openings with a plurality of the screws and a plurality of the nuts, wherein each opening has scalloped extensions, and wherein each scalloped extension allows a respective one of the nuts to pass from the exterior region into the interior region.

20. The electronic device defined in claim 19 wherein each electrical component has a circular outline, wherein each opening has a circular shape with at least four of the scalloped extensions, wherein the array of openings has 20-100 openings, wherein a circular elastomeric gasket is interposed between a portion of each electrical component and a portion of the cylindrical housing wall surrounding the opening in which that electrical component is mounted, and wherein the nuts are each rotatable between an installation position in which the nut clears the cylindrical housing wall and passes through one of the scalloped extensions and a locked position in which the nut secures one of electrical components to the housing.

* * * * *